No. 847,946. PATENTED MAR. 19, 1907.
C. A. KAISER.
ROTARY AIR OR FLUID COMPRESSOR.
APPLICATION FILED FEB. 10, 1905.

3 SHEETS—SHEET 1.

WITNESSES
William M. Miller
Edward Wiesner

INVENTOR
Charles A. Kaiser
BY
W. C. Hauff
ATTORNEY

No. 847,946. PATENTED MAR. 19, 1907.
C. A. KAISER.
ROTARY AIR OR FLUID COMPRESSOR.
APPLICATION FILED FEB. 10, 1905.
3 SHEETS—SHEET 2.
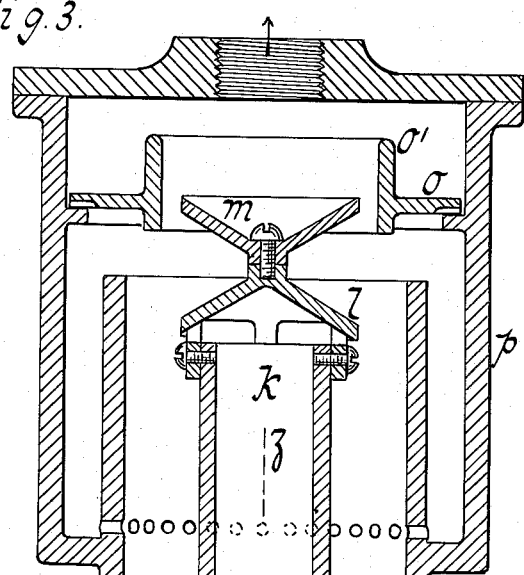
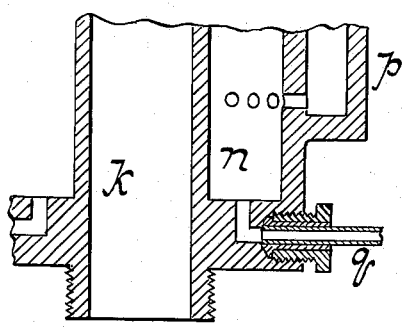
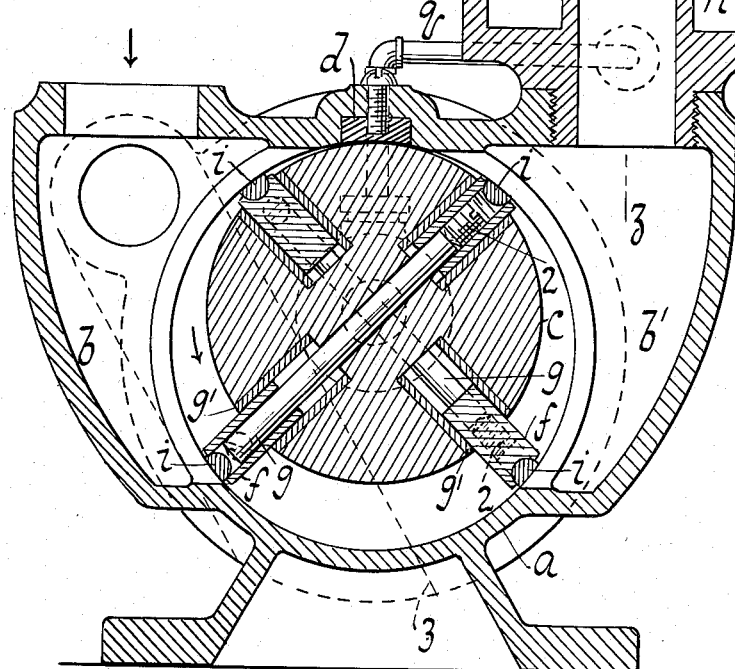
WITNESSES:
William Miller
Edward Wiesner
INVENTOR
Charles A. Kaiser
BY
W. C. Hauff
ATTORNEY No. 847,946. PATENTED MAR. 19, 1907.
C. A. KAISER.
ROTARY AIR OR FLUID COMPRESSOR.
APPLICATION FILED FEB. 10, 1905.

3 SHEETS—SHEET 3.

WITNESSES:
William Miller
George Hulsberg

INVENTOR
Charles A. Kaiser
BY
W. C. Hauff
ATTORNEY

UNITED STATES PATENT OFFICE.

CHARLES A. KAISER, OF ASTORIA, NEW YORK, ASSIGNOR OF ONE-THIRD TO LEO FLATOW, OF NEW YORK, N. Y.

ROTARY AIR OR FLUID COMPRESSOR.

No. 847,946.      Specification of Letters Patent.      Patented March 19, 1907.

Application filed February 10, 1905. Serial No. 245,157.

*To all whom it may concern:*

Be it known that I, CHARLES A. KAISER, a citizen of the United States, residing at Astoria, in the county of Queens and State of New York, have invented new and useful Improvements in Rotary Air or Fluid Compressors, of which the following is a specification.

This invention resides in certain novel features of construction set forth in the following specification and claim and illustrated in the annexed drawing, in which—

Figure 1:
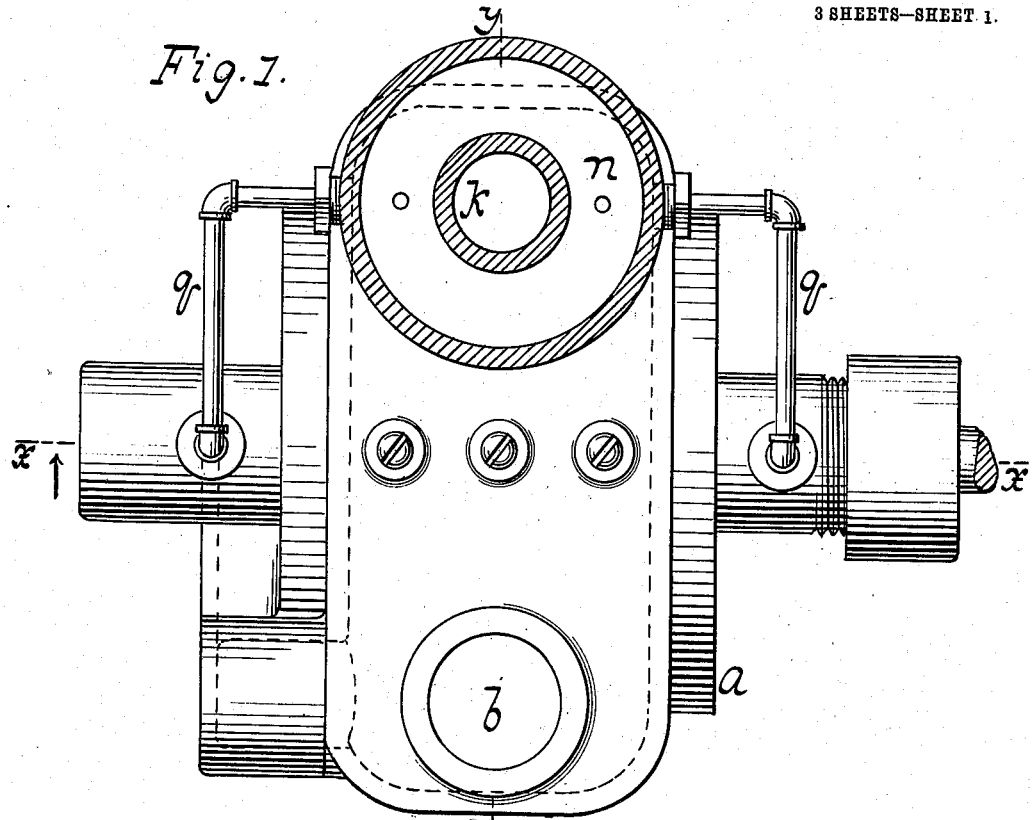
Figure 2:
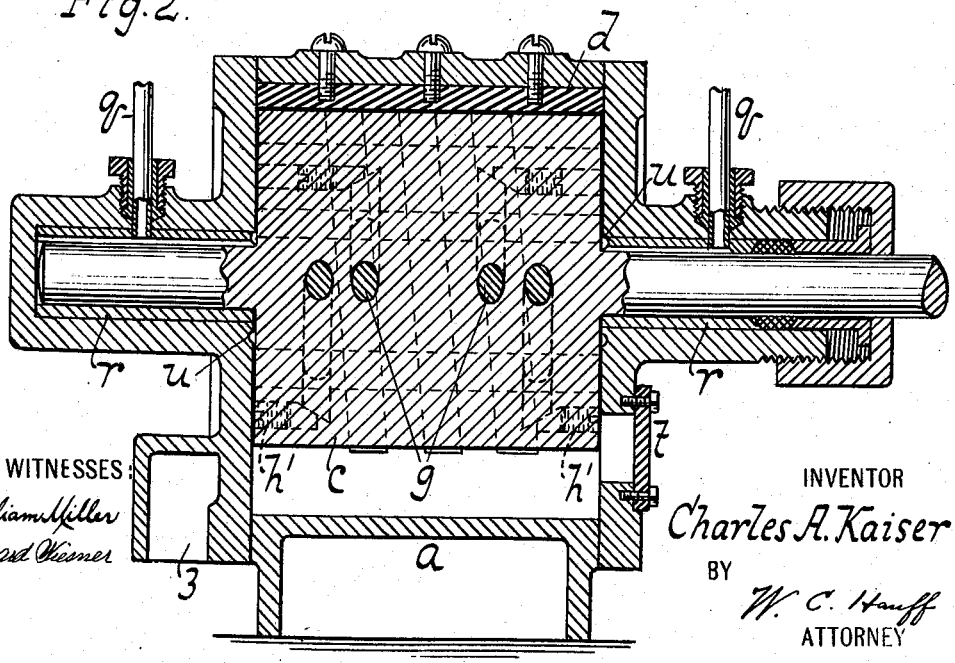
Figure 5:
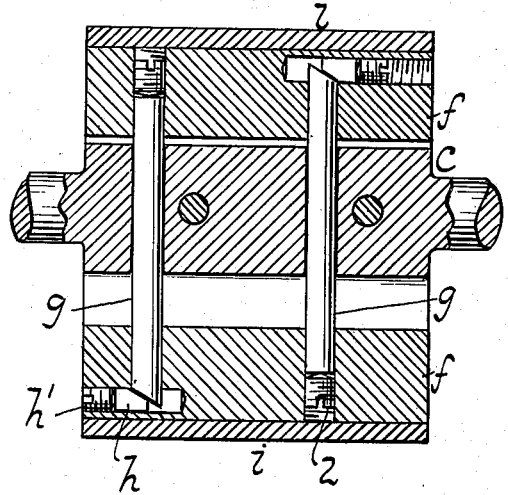
Figure 6:
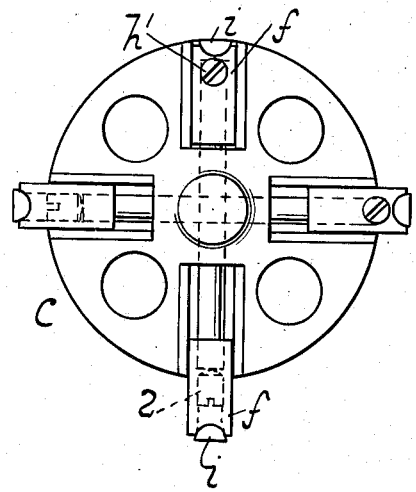

Figure 1 is a plan view of a compressor embodying this invention. Fig. 2 is a section along $x$ $x$, Fig. 1. Fig. 3 is a section along $y$ $y$, Fig. 1. Fig. 4 is a section along $z$ $z$, Fig. 3. Fig. 5 is a section of a drum, exposing valve-rods. Fig. 6 shows a side elevation of Fig. 5.

In this drawing is shown a cylinder $a$, communicating with inlet $b$ and outlet $b'$. A drum or cylinder $c$ rotates in contact with a packing $d$. This packing, of brass or other suitable material, can be set or adjusted by a screw or suitable means and is located between the inlet and outlet portions of the cylinder.

The plungers or pistons $f$ are shown with connecting-rods $g$. These pistons are shown in housings $g'$, which housings are of non-corrosive metal. These housings are carried by the drum. Plates of suitable non-corrosive material set into the drum will form the housings.

The packings $i$ are shown placed onto the outer or contact edges of the respective pistons or plates $f$, and which pistons are adjustable by wedges $h$ and screws $h'$. The air passing or forced along a channel or outlet attachment $k$ strikes against bafflers $l$, so that oil or foreign matter is thrown off and lands in the separating chamber or reservoir $n$. The deflectors or bafflers $m$ throw the air against or toward a diaphragm $o$ or its rim or flange $o'$, so that foreign matter passing over onto diaphragm $o$ passes thence into reservoir $p$, where it passes into the reservoir $n$. A pipe or pipes $q$ lead oil to the compressor or drum, so as to lubricate or pack the same or its bearings $r$. The bafflers $l$ $m$ are shown superposed and facing or inclined in opposite directions. Baffler $l$ is tapered or directed down or into reservoir $n$, while baffler $m$ is directed in the opposite direction or upward. The reservoirs $n$ $p$ concentrically surround one another and the bafflers and communicate with one another, so that oil can pass from chamber $p$ to chamber $n$. The diaphragm $o$ is supported on a flange extending about the interior of chamber $p$. This diaphragm does not fit tight in the chamber, and the diaphragm and the interior of the chamber being left rough or unfinished as these parts come from casting or from the foundry, the oil settling on part $o$ will leak or pass down to pipe $q$. The under face of diaphragm $o$ or its contacting parts could also be channeled or roughened by file or other cuts to allow leakage or passage of oil, but usually the unfinished or rough condition of the casting will allow sufficient leakage. The separating chamber or chambers $p$ and $n$ could be cast with conduit $k$ or suitably connected thereto.

The piston or plunger $f$ can have the packing $i$ adjusted to compensate for wear. By turning screws $h'$ so as to force the wedges in the proper direction the packing is carried or forced to the cylinder. Any suitable screw or adjusting device can be provided for the packing. Suitable tool holes or openings $t$ at the base of the cylinder head or cover give access to screws $h'$ for a screw-driver or instrument. Each screw $h'$ when moving inward will force its wedge $h$ against rod $g$ to move or set the piston $f$ with packing $i$. Each piston is also shown with a screw 2, adapted to set the respective rod $g$ or form an abutment for the rod in the piston. The adjustability of the pistons on the rods provides means to compensate for wear. The cylinder $a$ is slotted or has openings at suitable points for air or fluid to enter and leave at the inlet and outlet $b$ and $b'$. The connecting-rods $g$ are made to firmly connect or unite opposite pistons, so that they move in unison to be in tight contact with the inside of the cylinder without any spring being required for said valves. The oil delivered to the bearing will pass along channel $u$ to the drum and thence to the circumference thereof to the packing to lubricate and cause tight joints between the drum and cylinder.

At one end of rods $g$ are shown screws $h'$ and wedges $h$ for adjusting to any extent required for compensating for shortness of the rod. One end of each rod is shown seated against a screw 2. Before the parts are assembled the screws 2 are inserted in the pistons *f* in such position that each rod sitting against a screw 2 will have its other end projecting into the path of the wedge *h*, as such wedge is set by screw *h'*. In the course of time, as the screw 2 may need further adjustment, the device would have to be taken apart sufficiently to give access to screws 2; but adjustment of the screws 2 is not frequently called for. In other words, the screws 2 are used to set the rods in proper position for the wedges *h* to be forced by screws *h'* against the rods, and these screws *h'* are readily accessible, as explained, on the removal of cover *t*. The wedges *h*, as they are forced against the rods, will cause the pistons *f* to be spread or separated farther from one another, and consequently press against packing *i*, sitting against the inner wall of the cylinder.

The air from the intake *b* can be obtained in whole or in part from a conduit 3, which, extending along an end or both ends of the cylinder, will serve to cool the cylinder to some degree.

What I claim as my invention, and desire to secure by Letters Patent, is—

1. A blower or compressor comprising a fixed cylinder with inlet and outlet portions, a packing between said inlet and outlet, an eccentrically-mounted rotary cylinder in permanent contact with the packing, diametrically-movable pistons in the rotary cylinder, and connecting-rods for the pistons, the latter being provided with adjusting-screws to set the same for maintaining permanent contact with the fixed cylinder during rotation the pistons having openings giving access to the screws without dismounting the parts.

2. A blower comprising a cylinder, a rotary drum with pistons, packings seated in the pistons and made to bear against the cylinder, connecting-rods extended into the pistons, and screws in the pistons and wedges adapted to be forced by the screws against the rods to spread or move the pistons away from one another.

3. A blower comprising a cylinder, a rotary drum in the cylinder, pistons in the drum, connecting-rods made to terminate in the pistons, wedges in the pistons, and screws for forcing the wedges against the ends of the rods in the pistons to slide or spread the latter on the rods.

4. A blower comprising a cylinder, a rotary drum in the cylinder, pistons in the drum, rods on which the pistons are adjustably mounted, screws in the pistons made to sit against one end of the rods and adjusting wedges and screws in the pistons for engaging the other ends of the rods, said pistons having openings giving access to the screws, and the cylinder having a tool-hole for allowing access to the pistons.

5. A blower comprising a cylinder, a rotary drum with oppositely-located sliding piston, rods extended into and made to rigidly abut against both pistons to reciprocate simultaneously with the same during the operation of the device, adjusting-screws made to sit rigidly against one end of the rods, and adjusting wedges and screws for acting against the other ends of the rods, said rods being smooth or unthreaded so as to be capable of being set or adjusted in the pistons by the adjusting screws and wedges.

In testimony whereof I have hereunto set my hand in the presence of two subscribing witnesses.

CHARLES A. KAISER.

Witnesses:
 GEORGE HULSBERG,
 WILLIAM MILLER.